United States Patent Office 2,804,143
Patented Aug. 27, 1957

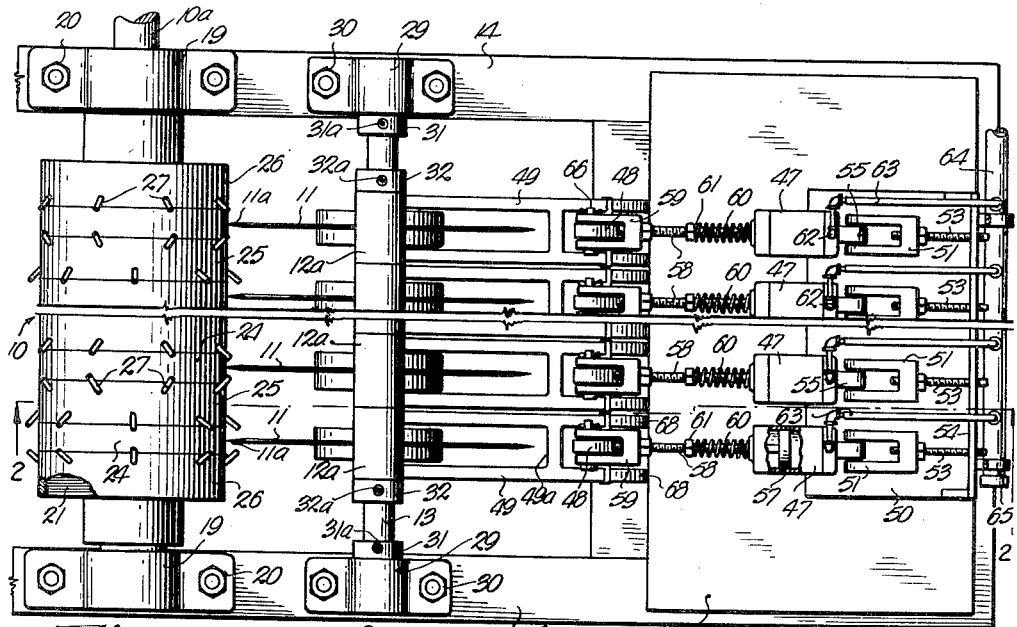
Fig. 1.
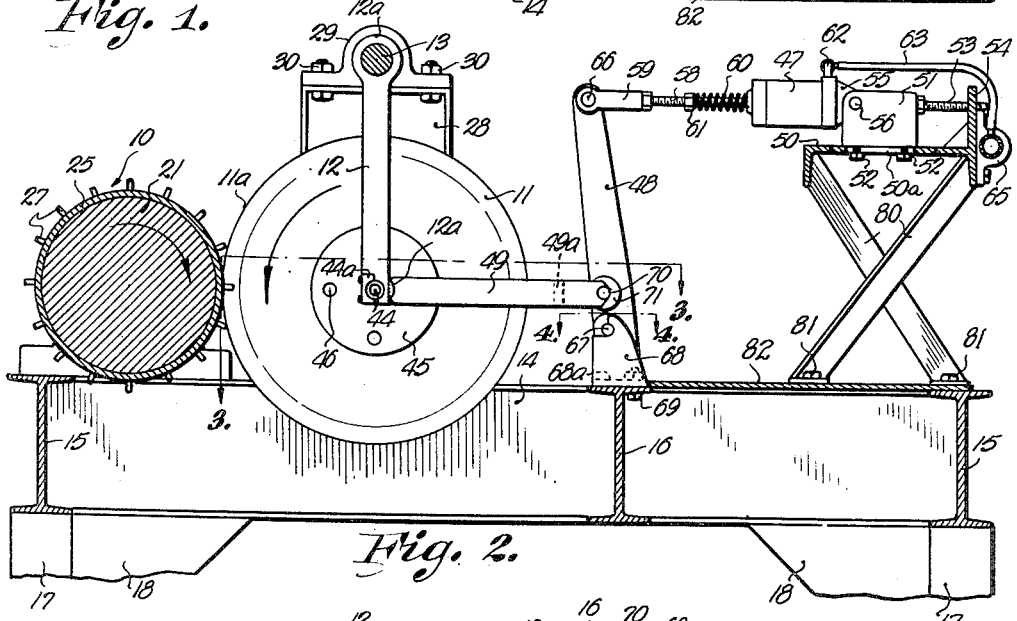
Fig. 2.
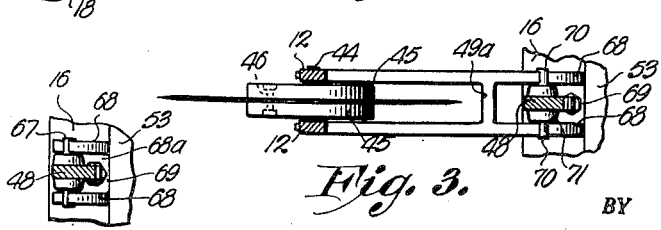
Fig. 3.
Fig. 4.
INVENTORS.
Joseph F. Stephens
Max W. Coble
George H. Sawers
ATTORNEY.

2,804,143

FIBER CUTTING MACHINE

Joseph F. Stephens, Kansas City, Mo., and Max W. Coble, Leawood, and George H. Sowers, Spring Hill, Kans., assignors to Gustin-Bacon Manufacturing Company, a corporation of Missouri Application October 6, 1954, Serial No. 460,534

4 Claims. (Cl. 164—61)

This invention relates to cutting machines, and more particularly to a machine for subdividing hanks of thread-like material, for example glass filaments, into fibers of relatively short length.

In the manufacture of various items, such as insulation mats or the like, from glass textile fibers, a preliminary step to collection and bonding of the fibers into the integrated mat structure is chopping or cutting the glass filaments into fibers of the desired length.

Conventionally, the glass filaments are drawn from heated bushings and collected as a continuous strand on a rapidly rotating wind-up drum which oscillates longitudinally to build up a coil of uniform thickness. Following this drawing or collecting step, the coil is severed longitudinally of the drum and flattened out to form a hank having a length equal to the circumference of the wind-up drum, which in practice may be from 36 to 72 inches. The final step involved is chopping or cutting the filaments of the hank into relatively short fibers suitable for the further manufacturing steps.

A primary object of this invention is to provide apparatus for the chopping or cutting step referred to above which in operation insures that all the filaments will be individually subdivided into fibers of the desired length.

Another object is to provide a cutting machine which is continuous in operation, and which by virtue of its unique construction, is capable of delivering cut fibers at a much faster rate than previously known machines with considerably less power required for operation.

A further object is to provide a cutting machine in which the hanks of filaments are fed by positive means between a hard surface cylindrical roll and a plurality of axially spaced circular cutting blades which are mounted for rotation about an axis spaced laterally from and substantially parallel to the roll axis. The cutting blades are also independently movable laterally toward and from the roll, and yieldable means are provided for continually urging the blades toward the roll so that the sharp edges are maintained in pressure contact with the surface of the roll whereby rotation of one serves to drive the other in the opposite direction.

Another object is to provide a cutting machine of the character described in which by a unique system of levers and arms, air pressure values such as those ordinarily available in industrial plants can be utilized to produce the high forces necessary to insure of efficient cutting. In this connection, it is a further object to provide a machine in which assembly and disassembly of the respective parts can be accomplished with ease and facility.

Other and further objects, together with the features of novelty, will appear in the course of the following description.

In the accompanying drawing which forms part of the specification and is to be read in conjunction therewith, and in which like reference numerals indicate like parts in the various views:

Fig. 1 is a top plan view of a preferred embodiment of the invention with part broken away to indicate length;

Fig. 2 is a sectional view taken along the line 2—2 of Fig. 1 in the direction of the arrows;

Fig. 3 is a sectional view taken along the line 3—3 of Fig. 2 in the direction of the arrows; and Fig. 4 is a sectional view taken along line 4—4 of Fig. 2 in the direction of the arrows.

Referring to the drawing, and particularly to Figs. 1 and 2, the basic cutting mechanism of our invention comprises a rotary feed and bearing roll 10 and a plurality of axially spaced circular cutting blades or knives 11 disposed at one side of the roll with their cutting edges 11a bearing against the roll 10. The blades 11 are individually supported in hanger brackets 12 pivotally depending from a hanger shaft 13, and a system of pressure cylinders, lever arms, and thrust members, all of which will be more fully described hereinafter, is provided for maintaining a tight but yieldable contact between the blades and the roll.

In the illustrated embodiment, the entire unit is carried on a single support frame which resembles an open-top table. The two sides of the frame comprise spaced, parallel I-beams 14 which are connected at their ends by cross beams 15 to form a rigid, frame-like structure. An intermediate cross-beam 16 is also provided. The frame is supported horizontally on legs 17 at the corners, and suitable brace plates 18 are provided to give the necessary strength for supporting the unit.

As is evident from Fig. 1, the feed and bearing roll 10 is supported between the sides of the frame by means of journal bearings 19 which are secured to the upper surfaces of the beams 14 by bolts 20. The roll 10 comprises a central, cylindrical core 21 having trunnion portions at the ends which are received in the bearings 19, and a plurality of individual annular bands or rings 24 and 25 which are slipped over the core and fixedly secured thereon by means of threaded collars 26 at each end. The rings 24 and 25 are press fitted to the core to prevent any relative rotation therebetween.

It will be noted that the rings 24 and 25 are located alternately along the roll, the rings 24 coinciding with the location of the knives 11 and the rings 25 serving as spacers therebetween. Since the rings 24 serve as the bearing surfaces for the knives, they are formed of a relatively hard material. We have found that a steel having a hardness range of from 62 to 64 on the Rockwell "C" scale gives the best results when used with a knife of the same steel having a hardness of from 58 to 64 on the Rockwell "C" scale. Experiments have shown that the hardness of the blades is critical; a blade too soft will mushroom and dull, and a blade too hard will splinter and chip.

The intermediate or spacer rings 25 may be formed of any suitable mild steel or other metal. Each is provided along its opposite edges with a peripheral row of non-radial pegs or teeth 27 which extend toward the center of the adjacent bearing ring 24 and terminate in close proximity to the adjacent faces of the knives or blades 11. These pegs can be secured to the roll in any suitable fashion. Preferably, they are press fitted into corresponding inclined holes drilled into the rings 25.

As mentioned earlier herein, the blades 11 are each independently hung from a hanger shaft 13, which is disposed parallel to the axis of the roll 10 and to one side and above the roll. The hanger shaft is supported at its ends on the upper ends of a pair of vertical risers 28 which are secured at their lower ends to the respective side beams 14 of the frame. The ends of the shaft 13 are received in bearings 29 secured to the risers by bolts 30, and annular collars 31 are provided inboard of the bearings to prevent longitudinal movement of the shaft. The collars 31 are fitted with lateral set screws 31a to permit adjustment.

Rotatably encircling the shaft 31 intermediate the ends thereof are the sleeve-like upper ends 12a of the hanger brackets 12 by which each knife 11 is supported. The sleeves 12a adjoin one another along the shaft, and are fixed against longitudinal movement on the shaft by stop collars 32 having lateral set screws 32a. The lower portion of each hanger 12 is formed as a yoke-like member having spaced, parallel legs between which the knife 11 is rotatably supported on a pin 44. Pin 44 is journaled at the ends of the hanger legs in split clamps 44a. Each blade is sandwiched between the two halves 45 of a split hub which is rotatably supported by the pin 44, and circumferentially spaced bolts 46 extend through registering apertures in the blade and hub halves to connect them as an integral unit.

Each blade or knife 11 is continually urged against the roll 10 by means of a pressure system comprising a fluid operated cylinder 47, a pivotal lever arm 48, and horizontal thrust member 49. The cylinders 47 for the respective blades are supported in a parallel bank at the rear of the machine on a raised platform 50 which is carried at its ends on crossed struts 80. The lower ends of the struts 80 are secured by bolts 81 to a cross plate 82 supported at its ends and secured to the side beams 14 of the frame.

Each cylinder 47 is connected with the platform 50 through a generally channel-like bracket 51, which is adjustable toward and from the hanger shaft 13 relative the platform. The bottom of the channel members rest upon the platform and are connected thereto for sliding movement by bolts 52 which extend through elongated guide slots 50a in the platform. To provide means for adjusting their position, elongated bolts 53 are rotatably secured at one end to the back of the channels 51 and threaded through an upstanding flange 54 rising from and secured to the rearward edge of the platform 50.

As is believed evident from the drawing, each cylinder 47 is pivotally connected with its respective support bracket 51 by means of a tongue 55 received in a loose fit between the upstanding sides thereof. A pin 56 extends through the sides and the tongue 52, and the cylinder is free for pivotal movement with respect thereto.

The interior of each cylinder 47 is fitted with a reciprocable piston 57 having connected thereto a stem 58 which extends through the free end of the cylinder. A clevis 59 is threaded on the outer end of the stem 58 for connection with the upper end of the pivotal lever arm 48 corresponding thereto. A coil compression spring 60 encircles the stem 58 adjacent the end of the cylinder 47, bearing at one end against the end of the cylinder and at the other against a nut 61 threaded onto the stem.

It will be noted that the length of the stem 58 is such that with the blades 11 in contact with the roll 10, the piston 57 is near but still spaced from the outer end of the cylinder. Pressure is applied to the interior of each cylinder 47 through a fluid inlet which has coupled therewith a conduit 63. The conduits 63 are each connected with a manifold 64 extending along and secured to the rear side of the platform 50 by brackets 65, and the manifold is connected with a source of fluid air pressure, such as a compressor (not shown).

The force exerted by the fluid pressure inside each cylinder 47 is transmitted by the piston 57 through the stem 58 to the upper end of its lever arm 48. The clevis 59 is pivotally pinned to the arm 48 by a pin 66, and the arm is supported for pivotal movement near its lower end on trunnions 67 extending from each side. The trunnions are pivotally supported in forwardly opening recesses which are formed in the upstanding legs of a U-shaped channel bracket 68 having its web 68a bolted to the top of the cross beam 16 by a bolt 69. Each arm 48 is provided with its own individual support bracket 68, and the brackets are aligned in a row across the top of the beam 16.

Connecting with each lever arm 48 intermediate the pivot 67 and the upper end thereof is the horizontal thrust member 49 which extends toward and bears laterally against the lower end of its respective hanger 12. As best seen from Fig. 3, the thrust members 49 each comprise two spaced parallel arms disposed on opposite sides of their respective knives 11 and lever arms 48 which are interconnected in the space between by a cross member 49a to form a double ended yoke. The ends of the yoke adjacent the lever 48 are provided with arcuate recesses conforming with and adapted to pivotally fit against pins 70 extending from enlarged bosses 71 on each side of the lever. The opposite ends of the yoke are similarly recessed, being adapted to fit against semicircular bearing blocks 12a secured to the opposite legs of the knife hanger 12.

The manner of operation of the invention is as follows: The roll 10 is driven in the direction indicated by the arrow by means of any suitable power source (not shown) connected with the roll through the drive shaft 10a. By virtue of their tight contact with the roll, the blades 11 are rotated in the opposite direction. The hanks of uncut fiber are dropped longitudinally on the roll 10, and through engagement therewith by the teeth 27, are carried between the feed roll and blades where they are severed into short lengths equal to the spacing between the blades. The cut fibers, as is evident, are free to drop by gravity from the cutting zone and can be collected in any suitable receptacle.

The knives or blades 11 are continually urged toward the roll 10 by the fluid pressure in the cylinders 47. Through the lever arm 48, the thrust exerted by the pressure in each cylinder is multiplied by the lever ratio of the arm 48 (preferably approximately 6 to 1) and impressed against the lower ends of the knife hangers 12 through the thrust members 49. The pivotal mounting of the hangers 12, and the pivotal bearings 12a and 70 supporting the thrust members 49, permit separation of the knives 11 and roll 10 in the event that an excessive thickness of glass fibers is put through the cutting zone. This insures against possible damage to the blades.

The linkage we have provided between the pressure cylinders and the blades makes it a simple matter to remove the individual blades from their respective hangers. First, the pressure is relieved in the cylinders 47 by shutting off the pressure source to the manifold, and venting the cylinders to the atmosphere, for example, by uncoupling the tubes 63 from the cylinders. The coil springs 60 will exert enough pressure to still maintain the blades 11 in contact with the roll 10. However, by grasping the lever arm 48 and pulling toward the cylinder against the spring, the arm can be pivoted about its axis 67 and separated from the adjacent ends of the yoke 49. This frees the yoke for removal from between the arm 48 and the hanger 12, and removal of the yoke permits lifting of the arm 48 from its channel support 68 to clear the way for rearward swinging of the blade 11. Once swung rearwardly, the split clamp 44a can be removed, thus freeing pin 44 and permitting removal of the blade and pin from the hanger. To reassemble the unit, the reverse procedure is carried out. The arm 48 is first engaged in the bracket 68, and then pivoted toward the cylinder 47 while the yoke 49 is inserted between the hanger 12 (with which the blade has been reassembled) and the arm. Holding the yoke in alignment with the bearings 12 and pins 70, the arm is allowed to return under action of the spring 60 and the unit is again assembled. The conduits 68 are again coupled with the cylinders, and pressure admitted to apply the necessary force to the blades.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a cutting machine of the type having a support frame, a horizontally disposed rotatable anvil roll carried by said frame, and a circular cutter blade adapted to act peripherally against said anvil roll, the combination which includes a hanger shaft substantially parallel with the anvil roll axis and supported above and to one side of said roll, a hanger member swingably depending from said shaft, said cutter blade being carried by said hanger member and being mounted for rotation about an axis substantially parallel to said roll axis and in the same horizontal plane as said roll axis, and means continually urging said member toward said roll to maintain the edge of said blade in bearing contact with the roll, said means including an upright lever arm on the opposite side of said hanger member from said roll and pivoted to said support frame, a transverse thrust member extending from said lever arm and engaging said hanger member, said thrust member extending from said lever arm at a point closely adjacent the pivot axis for said lever arm, and mechanism for applying a yieldable pivotal force to said arm at a point remote from the pivot axis thereof tending to pivot said arm toward said hanger member.

2. In a cutting machine of the type having a support frame, a horizontally disposed rotatable anvil roll carried by said frame, and a circular cutter blade adapted to act peripherally against said anvil roll, the combination which includes a hanger shaft substantially parallel with the anvil roll axis and supported to one side of and above said anvil roll, a hanger member swingably depending from said shaft, said cutter blade being carried by said hanger member and being mounted for rotation about an axis substantially parallel to said roll axis and in the same horizontal plane as said roll axis, a pivotal lever arm spaced laterally from said blade on the opposite side of said roll, said arm being pivoted about an axis substantially parallel with the axis of said hanger shaft whereby the arm is movable toward and away from the hanger member, a removable transverse thrust member interposed between said arm and said hanger member and having bearing surfaces adapted to engage same, and yieldable means for applying a turning moment to said arm in a direction to force said thrust member tightly against said hanger member and thus cause said blade to engage said roll in a tight bearing contact.

3. In a cutting machine of the type having a support frame, a horizontally disposed rotatable anvil roll carried by said frame, and a circular cutter blade adapted to act peripherally against said anvil roll, the combination which includes a hanger shaft substantially parallel with the anvil roll axis and supported to one side of and above said anvil roll, a hanger member swingably depending from said shaft, said cutter blade being carried by said hanger member and being mounted for rotation about an axis substantially parallel to said roll axis, a pivotal lever arm spaced laterally from said blade on the opposite side of said roll, said arm being pivoted about an axis substantially parallel with the axis of said hanger shaft whereby the arm is movable toward and away from the hanger member, a removable transverse thrust member interposed between said arm and said hanger member and having bearing surfaces adapted to engage same, yieldable means for applying a turning moment to said arm in a direction to force said thrust member tightly against said hanger member and thus cause said blade to engage said roll in tight bearing contact, said yieldable means including a cylinder, a reciprocable piston within the cylinder having a stem extending through the end of said cylinder toward the lever arm and connected therewith, means for supplying a compressible fluid to the cylinder behind the piston, and second yieldable means independent of said cylinder for maintaining said turning moment on said lever arm during times when there is no pressure in said cylinder.

4. The combination as set forth in claim 3 wherein said second yieldable means comprises a compression spring encircling said stem exteriorally of said cylinder and a collar fixed to said stem and spaced from the end of said cylinder, said spring being disposed between said collar with its ends abutting the collar and end of the cylinder.

References Cited in the file of this patent

UNITED STATES PATENTS

| | | |
|---|---|---|
| 1,133,142 | Hirsch | Mar. 23, 1915 |
| 1,310,153 | Cameron et al. | July 15, 1919 |
| 1,440,908 | Cameron et al. | Jan. 2, 1923 |
| 1,465,967 | Cameron et al. | Aug. 28, 1923 |
| 1,678,340 | Johnstone | July 24, 1928 |
| 1,887,331 | Shomaker | Nov. 8, 1932 |
| 1,998,929 | Johnstone | Apr. 23, 1935 |
| 2,143,123 | Erickson | Jan. 10, 1939 |
| 2,154,256 | Zimmerman | Apr. 11, 1939 |
| 2,394,859 | Judelshon | Feb. 12, 1946 |
| 2,541,913 | Carter | Feb. 13, 1951 |
| 2,593,154 | Judelson | Apr. 15, 1952 |
| 2,643,719 | Schneider | June 30, 1953 |
| 2,684,117 | Wood | July 20, 1954 |

FOREIGN PATENTS

| | | |
|---|---|---|
| 449,766 | France | Mar. 7, 1913 |
| 484,402 | Great Britain | May 2, 1938 |
| 645,744 | Great Britain | Nov. 8, 1950 |